United States Patent [19]

Brooks et al.

[11] Patent Number: 5,048,118
[45] Date of Patent: Sep. 10, 1991

[54] COMBINATION DUAL LOOP ANTENNA AND BEZEL WITH DETACHABLE LENS CAP

[75] Inventors: Dwight D. Brooks, Boynton Beach; John J. Parkes, Lantana, both of Fla.

[73] Assignee: Motorola, Inc., Schaumburg, Ill.

[21] Appl. No.: 377,645

[22] Filed: Jul. 10, 1989

[51] Int. Cl.$^5$ .................. H04B 1/08; H01Q 1/22
[52] U.S. Cl. .................... 455/156; 455/344; 343/702; 343/742
[58] Field of Search ............. 455/156, 344, 351, 347; 340/311.1; 343/702, 720, 742; 458/347

[56] References Cited

U.S. PATENT DOCUMENTS

| | | |
|---|---|---|
| 4,114,299 | 9/1978 | Brownlee ................. 343/894 |
| 4,164,709 | 8/1979 | Tudor et al. ................. 455/88 |
| 4,853,682 | 8/1989 | Asano et al. ................. 340/706 |

*Primary Examiner*—Herbert Goldstein
*Assistant Examiner*—Lisa Charouel
*Attorney, Agent, or Firm*—Daniel R. Collopy; Vincent B. Ingrassia; William E. Koch

[57] ABSTRACT

An electronic device includes a printed circuit board for mounting electronic components thereon. An antenna, such as a dual loop antenna, is secured to the printed circuit board and acts as a bezel to mount a display, such as a liquid crystal display, onto the printed circuit board. A lens cap through which the display may be viewed is positioned over the display and is detachably coupled to the antenna for securing the display to the antenna/bezel.

11 Claims, 3 Drawing Sheets

COMBINATION DUAL LOOP ANTENNA AND BEZEL WITH DETACHABLE LENS CAP

FIELD OF THE INVENTION

This invention relates in general to electronic devices with antennas and displays and more particularly to electronic devices having a combination dual loop antenna and bezel with a detachable lens cap.

BACKGROUND OF THE INVENTION

Many electronic devices on the market today provide information to the user through the use of a visual display. The visual displays are electronically and physically coupled to the electronic device. The display is normally retained within a bezel which is mounted on the device's printed circuit (PC) board and an aperture is provided in the housing of the electronic device for viewing the display. The aperture is covered with a lens cap to allow improved viewing of the information displayed.

Conventionally, when mounting the display and the bezel to the PC board, uniquely shaped tabs are provided which fit through slits in the PC board and are twisted on the other side to provide a secure and reliable physical coupling. Installation of the display requires the use of a special tool to twist and secure the tabs. Also, one of the major early failures of frequently used electronic devices with displays is the display itself. A repairman must have a special tool to remove the display and the bezel and must spend a great deal of time physically and electronically recoupling the display and bezel to the PC board.

In transceiver devices with displays, such as selective call receivers, an antenna may be installed within the device. One common means of providing constant reception without the use of a telescoping antenna is to mount a loop antenna within the device. A common design, especially in selective call receivers is the dual loop antenna. The loops of the antenna are normally mounted on the PC board, along with the bezel and display, to allow physical and electrical coupling with the components of the device. Because of the loop design and the small cross-section of the loops, a special fixture is needed to hold the antenna loops in place until they are firmly attached through soldering or other means to the PC board. In small electronic transceivers, the close proximity of the metal bezel to the antenna loops sets up a parasitic capacitance between the antenna loops and the bezel. This unwanted capacitance problem is heightened by a decrease in size of the device, a step which is essential for keeping a competitive edge in today's marketplace.

Thus, what is needed is a display with a bezel which does not generate parasitic capacitance with an antenna mounted on the same PC board and which does not require special tools during manufacture and repair for disassembling the bezel and/or the antenna.

SUMMARY OF THE INVENTION

Accordingly, it is an object of the present invention to provide improved access to a display for installation and repairs.

It is a further object of the present invention to provide an antenna for mounting a display within an electronic device.

In carrying out the above and other objects of the invention in one form, there is provided an antenna for mounting a display within an electronic device. A lens cap detachably secures the display within the electronic device.

The above and other objects, features, and advantages of the present invention will be better understood from the following detailed description taken in conjunction with the accompanying drawings.

DETAILED DESCRIPTION OF THE INVENTION

Figure 1:
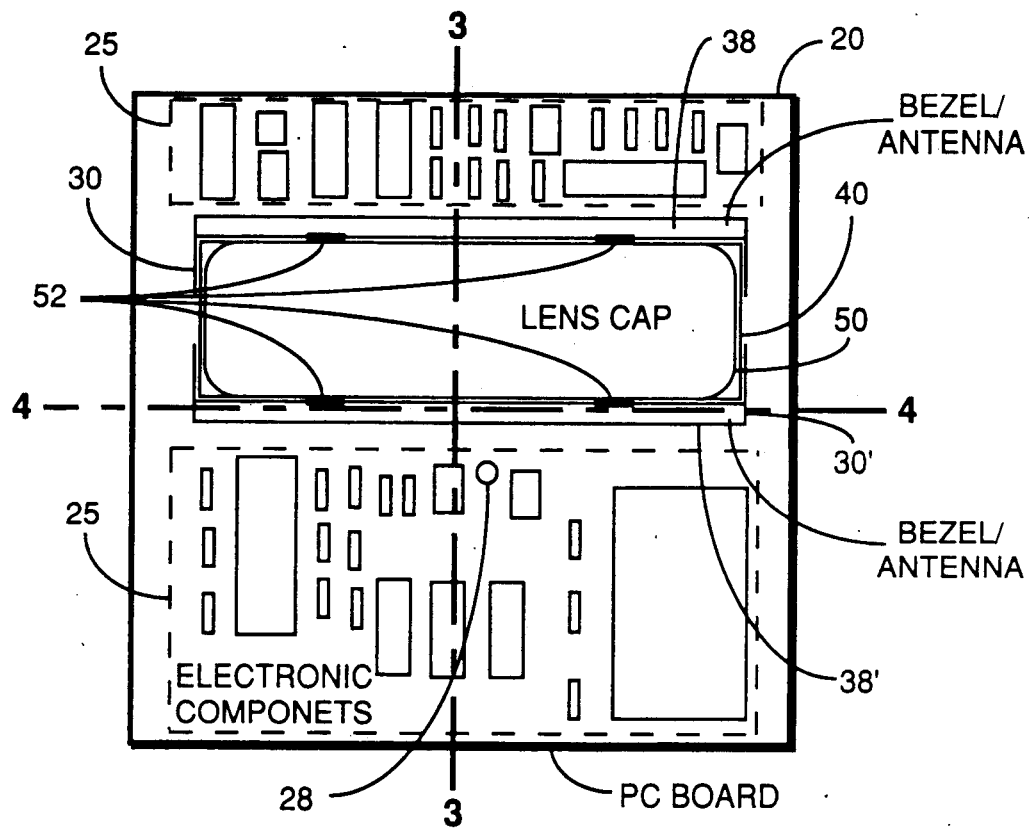
FIG. 1 is a top view of a printed circuit board according to the present invention.

Turning now to the various drawing figures, in which like numerals reference like parts, a detailed description of the preferred embodiment will be provided. Referring to FIG. 1, a printed circuit (PC) board 20 of a selective call receiver is shown with electronic components 25 mounted thereon. A hole 28 is formed in the PC board 20 to receive a mounting screw for securing the PC board 20 to the housing of the selective call receiver. Also mounted on PC board 20 is two-piece bezel 30 and 30' which snugly receives display 40. In the preferred embodiment, display 40 is a liquid crystal display (LCD). Other types of displays such as a light emitting diode (LED) display are also suitable for use in the present invention. Horizontal planar components 38 and 38 ' of two-piece bezel 30 and 30' also serve as the top halves of each loop of a dual loop antenna. Detachable lens cap 50 is transparent so that display 40 can be viewed through cap 50. Lens cap 50 is detachably secured to two-piece bezel 30 and 30' by four slot and tab connections 52.

Figure 2:
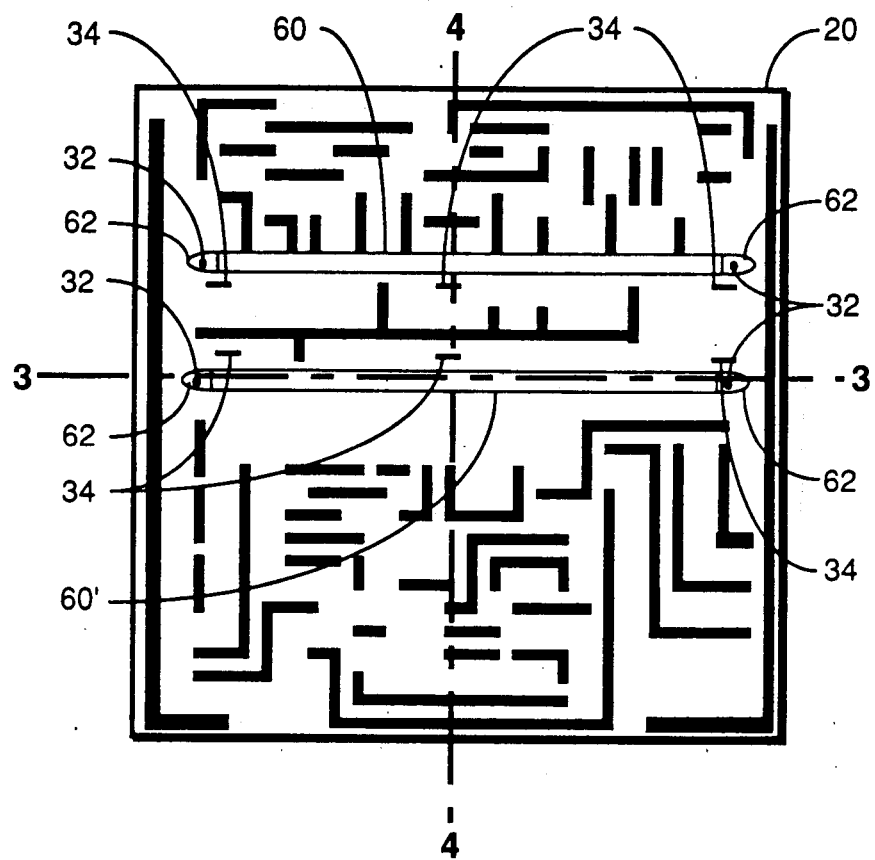
FIG. 2 is a bottom view of a printed circuit board according to the present invention.

Referring next to FIG. 2, the bottom side of PC board 20 containing the electronic routing for selective call receiver and the mounting screw hole 28 is shown. The bottom halves 60 and 60' of each loop of a dual loop antenna are integrally formed with end tabs 62. Tabs 32 are integrally formed with two-piece bezel 30 and 30' and extend through PC board 20 and end tabs 62 for mounting bottom halves of dual loop antenna 60 and 60' on PC board 20. Tabs 32 also electronically couple bottom halves 60 and 60' to horizontal planar portions 38 and 38' of two-piece bezel to form the two loops of the dual loop antenna. Six tabs 34 are also extruded from bezel 30 and 30' to stabilize the physical mounting of bezel 30 and 30'.

Figure 3:
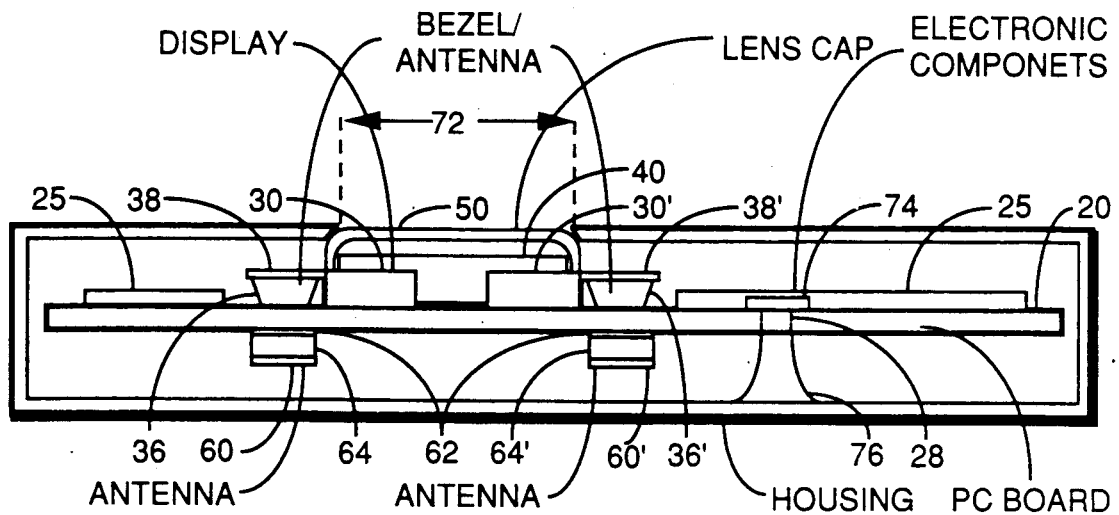
FIG. 3 is a cross-section view of an electronic device including the printed circuit board of FIG. 1 along line A—A.

Referring to FIG. 3, a cross-sectional view along line A—A (FIGS. 1 and 2) shows the construction of bezel portions 30 and 30'. The horizontal planar portions 38 and 38' of the bezel are connected to the bottom halves 60 and 60' of the dual loop antenna by trapezoidal plates 36 and 36' which end in tabs 32 (FIG. 2) for the through hole connection through PC board 20 to end tabs 62. In the cross-sectional view along line A—A, tabs 32 are hidden from view behind vertical planar portions 64 and 64' of bottom halves 60 and 60' of the dual loop antenna. Vertical planar portions 64 and 64' space bottom halves 60 and 60' from PC board 20. Display 40 fits snugly within bezel halves 30 and 30' and is held in place by lens cap 50. A housing 70 encloses the PC board 20 with the lens cap 50 extending through a viewing slot 72 such that the display 40 is viewable from outside the housing 70 through the slot 72. The PC board 20 is secured to the housing 70 by a mounting screw 74 passing through the hole 28 in the PC board 20 and into an extruded piece 76 integrally formed with the housing 70 to receive the mounting screw 74. Any of several other methods well-known to those skilled in the art may be used to secure the PC board 20 to the housing 70.

Figure 4:
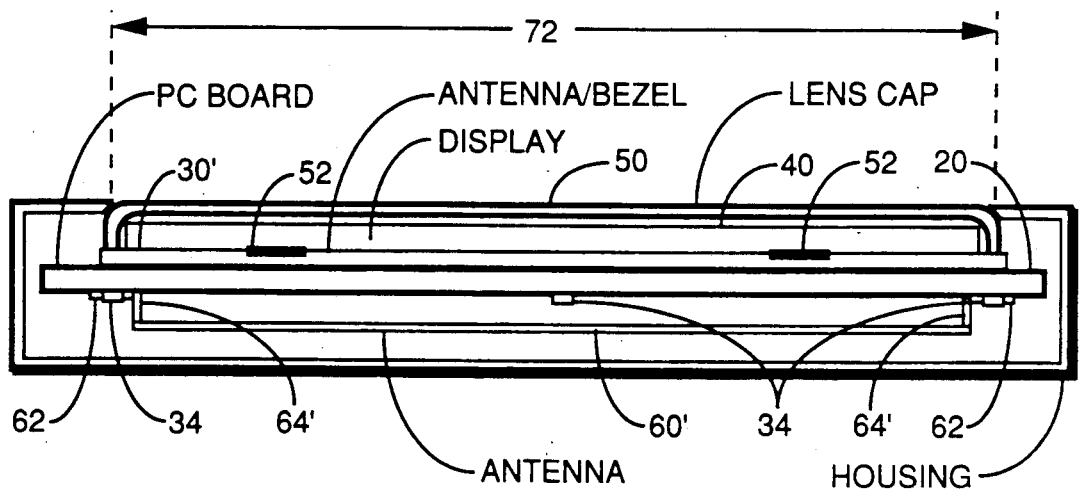
FIG 4 is cross-section view of an electronic device including the printed circuit board of FIG. 1 along line B—B.

Referring next to FIG. 4, in the preferred embodiment lens cap 50 is molded to fit over display 40 and clip into connections 52 so as to be detachably secured to bezel portion 30'. As would be obvious to one skilled in the art, lens cap 40 could be manufactured by methods other than molding. For instance, lens cap 50 could be stamped with the sides formed by distortion under heat. The viewing slot 72 is formed in the housing 70 such that the lens cap 50 fits snugly therethrough allowing viewing of the display 40 from without the housing 70. Tabs 34 insert through PC board 20 to firmly attach bezel portion 30' to PC board 20. Bottom half of antenna 60' is integrally formed with vertical planar portions 64' and end tabs 62 to loop away from PC board 20. The PC board 20 and the dual loop antenna, one loop comprising the bezel portion 30' and the bottom half 60', fit inside the housing 70.

In the manufacture of an electronic device with a display and a dual loop antenna, the display and antenna assembly are comprised of a bezel, a display, a lens cap, two antenna half loops for mounting on the top side of the PC board, and two antenna half loops for mounting on the bottom of the PC board—a total of at least seven layered items. The preferred embodiment of the present invention requires only six parts: display 40, lens cap 50, bezel portions 30 and 30', and bottom antenna loop portions 60 and 60'. Tabs 32 on bezel portions 30 and 30' couple through via holes in PC board 20 to antenna portions 60 and 60' to form the two loops of a dual loop antenna. During manufacture, tabs 32 and 34 retain bezel portions 30 and 30' in place while soldering of connections takes place. This eliminates the requirement for a unique hold down fixture to hold conventional antenna half loops in position during soldering.

Conventionally, the display would be mounted in the bezel before the bezel would be mounted on the PC board. One would need to take great care in attaching the bezel to the PC board in order that the display would not be damaged. In the preferred embodiment, bezel portions 30 and 30' are mounted to PC board 20 before display 40 is placed within the bezel. The bezel can then be attached to PC board 20 in a conventional manner eliminating the need for special mounting tools during installation and repair. Also, with the bezel serving the dual purposes of receiving the display display and forming a portion of the antenna, no parasitic capacitance would be present such as that formed in an air dielectric between the metal of a bezel and the metal of an antenna.

Figure 5:
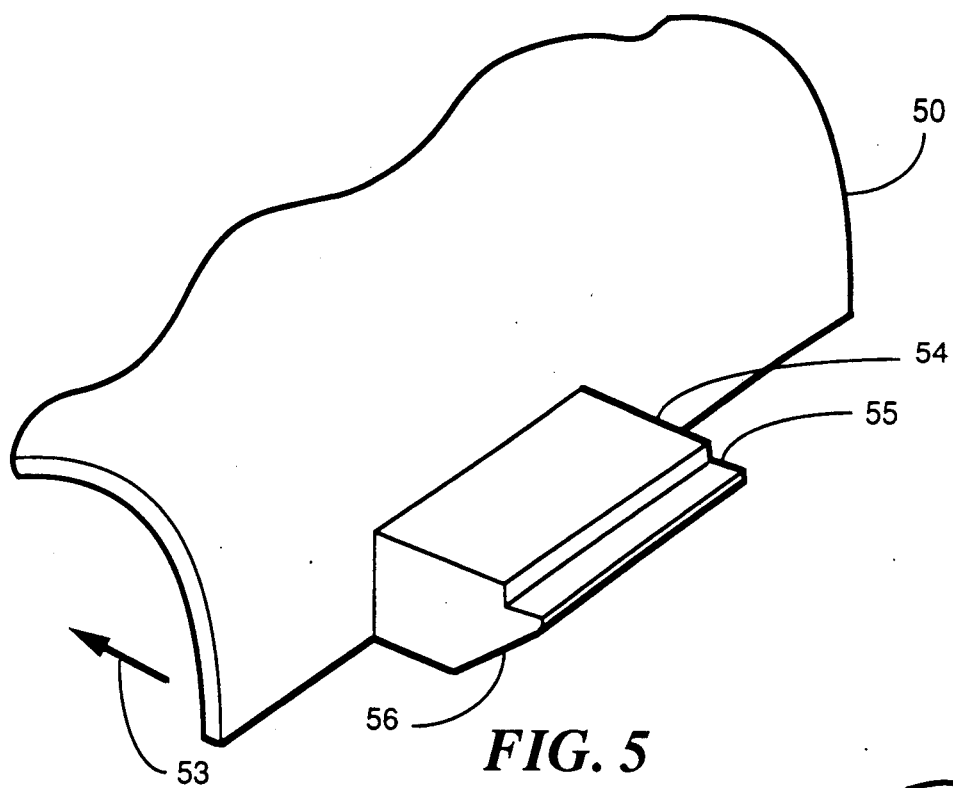
FIG. 5 is a perspective view of a connection clip according to the present invention.
Figure 6:
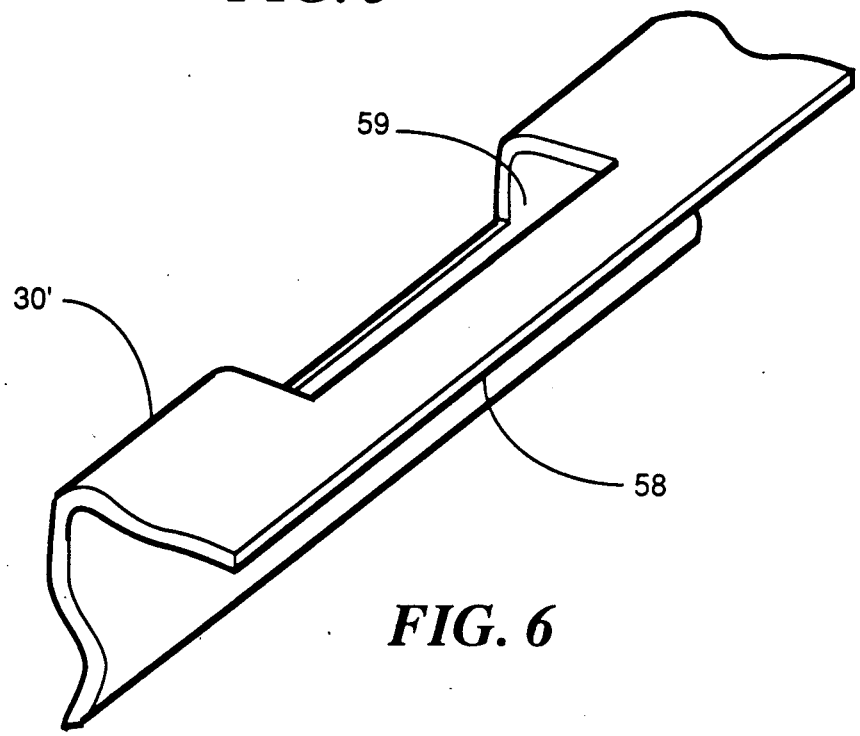
FIG. 6 is a perspective view of a connection slot according to the present invention.

Lens cap 50 is detachably secured to bezel portions 30 and 30' by connections 52. Referring to FIGS. 5 and 6, connections 52 are comprised of clips 54 (FIG. 5) attached to lens cap 50. Clip 54 fit into slots 59 (FIG. 6) on bezel portions 30 and 30'. Lip 55 of clip 54 fits under the edge 58 of slot 59. Slanted planar portion 56 of clip 54 causes clip 54 to move inward in the direction of arrow 53 as cap 50 is pushed down onto bezel portions 30 and 30'. When lip 55 of clip 54 clears edge 58 of slot 59, clip 54, being formed of the same resilient material as lens cap 50, resumes its initial shape and lip 55 resides underneath edge 58 preventing cap 50 from separating from the bezel. Lens cap 50 can be removed by placing pressure simultaneously on both sides of cap 50 and pushing inward until the edge of lip 55 clears edge 58. This allows easy access to display 40 for repairs.

By now it should be appreciated that there has been provided a combination dual loop antenna and bezel with a detachable lens cap. It is obvious to one skilled in the art that, in an electronic device with a display but without an antenna, the display could be detachably secured within bezel mounted on the printed circuit board of the device by a lens cap as described herein. Likewise, a bezel serving as a portion of an antenna in an electronic transceiver device could be used to secure a display onto a printed circuit board. The lens cap would then be mounted in the device's housing in a conventional manner. Additionally, it would be obvious to one skilled in the art that a display-receiving bezel could serve as an antenna half loop in a device with a single loop antenna.

We claim:

1. An electronic device having a housing with a viewing slot, the electronic device comprising:
    a printed circuit board mounted within said housing and secured to said housing;
    an antenna within said housing and physically coupled to said printed circuit board; and
    means for displaying information, said means mounted within said housing and viewable through said viewing slot, said means secured to said printed circuit board by said antenna.

2. An electronic device having a housing with a viewing slot, the electronic device comprising:
    a printed circuit board within said housing;
    a dual loop antenna within said housing and physically coupled to said printed circuit board; and
    means for displaying information, said means mounted within said housing and viewable through said viewing slot, said means secured to said printed circuit board by said dual loop antenna.

3. The electronic device of claim 2 wherein said dual loop antenna is mounted through said printed circuit board.

4. The electronic device of claim 3 wherein said means is formed as a quadrilateral and one loop of said dual loop antenna secures one side of said means to said printed circuit board and a second loop of said dual loop antenna secures a second side of said quadrilateral opposite to said first side to said printed circuit board.

5. An electronic device having a housing with a slot formed therein, the electronic device comprising:
    an antenna for transceiving a message, the antenna located completely within said housing and physically coupled to said housing; and
    means for displaying said message, said means located within said housing and viewable through said slot, the means secured to said housing by said antenna.

6. An electronic device comprising:
    electronic circuitry;

a first means for displaying information, said first means electrically coupled to said electronic circuitry;

a second means for physically receiving said first means, said second means comprising an antenna and electrically coupled to said electronic circuitry; and a third means for selectively securing said first means to said second means wherein said first means can be viewed through said third means.

7. The electronic device of claim 6 wherein said first means is a liquid crystal display.

8. The electronic device of claim 6 wherein said second means is a bezel.

9. The electronic device of claim 6 wherein said third means means is a lens cap.

10. The electronic device of claim 1 further comprising electronic circuitry comprising electronic components mounted on said printed circuit board, said electronic circuitry electrically coupled to said antenna and said means for displaying information.

11. The electronic device of claim 6 wherein said electronic device comprises a selective call receiver.

* * * * *